United States Patent
Liu et al.

(10) Patent No.: US 12,430,705 B2
(45) Date of Patent: Sep. 30, 2025

(54) METHODS AND DEVICES FOR MULTIPLE MODEL SINGLE DEPLOYMENT ENGINE IMPLEMENTATION

(71) Applicant: KWAI INC., Palo Alto, CA (US)

(72) Inventors: Yang Liu, San Jose, CA (US); Yongxiong Ren, San Jose, CA (US); Lingzhi Liu, San Jose, CA (US); Xing Wen, Palo Alto, CA (US)

(73) Assignee: BEIJING TRANSTREAMS TECHNOLOGY CO. LTD., Beijing (CN)

( * ) Notice: Subject to any disclaimer, the term of this patent is extended or adjusted under 35 U.S.C. 154(b) by 300 days.

(21) Appl. No.: 18/121,571

(22) Filed: Mar. 14, 2023

(65) Prior Publication Data

US 2024/0311946 A1 Sep. 19, 2024

(51) Int. Cl.
*G06T 1/20* (2006.01)
*G06F 9/50* (2006.01)
*G06T 1/60* (2006.01)

(52) U.S. Cl.
CPC .............. *G06T 1/20* (2013.01); *G06F 9/5038* (2013.01); *G06T 1/60* (2013.01); *G06F 2209/548* (2013.01)

(58) Field of Classification Search
CPC . G06T 1/20; G06T 1/60; G06F 9/5038; G06F 2209/548
See application file for complete search history.

(56) References Cited

U.S. PATENT DOCUMENTS

| | | | |
|---|---|---|---|
| 2018/0300098 A1* | 10/2018 | Vembar | G06F 3/1431 |
| 2018/0336063 A1* | 11/2018 | Nakada | G06F 9/4881 |
| 2020/0364088 A1* | 11/2020 | Ashwathnarayan | G06F 9/5016 |

OTHER PUBLICATIONS

Nvidia, "Multi-Process Service", vR520l Oct. 2022, (37p).

* cited by examiner

*Primary Examiner* — Michelle Chin
(74) *Attorney, Agent, or Firm* — Arch & Lake LLP

(57) ABSTRACT

Methods and apparatuses are provided for serving multiple models with a single engine. The method includes: providing a single engine for a plurality of models on a server, where the server includes at least one graphics processing unit (GPU) and memory coupled with the at least one GPU; loading the plurality of models onto the memory of the server at once; and serving, by the single engine, the plurality of models, where the single engine accommodates all structures and weights of the plurality of models with a shared input and output of the memory.

20 Claims, 5 Drawing Sheets

METHODS AND DEVICES FOR MULTIPLE MODEL SINGLE DEPLOYMENT ENGINE IMPLEMENTATION

FIELD

The present application generally relates to artificial intelligence model deployment, and in particular but not limited to, methods and apparatuses for deploying multiple models on a single engine.

BACKGROUND

It is a quite common practice to have several artificial intelligence (AI) models concurrently serving on a single heterogeneous hardware to maximize the computing potential of the respected hardware for throughput-oriented AI Applications. Usually, there are two main scenarios where multiple model deployment methods are applied. One would be to have multiple different models deployed on a single machine that constantly answer inference request. The other, more common one, is to have several copies of the same model residing on the heterogeneous hardware that takes requests from a single job queue using a first come, first serve methodology.

SUMMARY

In general, this disclosure describes examples of techniques relating to serving multiple models with a single engine.

According to a first aspect of the present disclosure, a single-engine serving method is provided. The method includes: providing a single engine for a plurality of models on a server, where the server includes at least one graphics processing unit (GPU) and memory coupled with the at least one GPU; loading the plurality of models onto the memory of the server at once; and serving, by the single engine, the plurality of models, where the single engine accommodates all structures and weights of the plurality of models with a shared input and output of the memory.

According to a second aspect of the present disclosure, an apparatus is provided for single-engine serving, including: a memory configured to store instructions executable by the one or more processors; where the one or more processors, upon execution of the instructions, are configured to: provide a single engine for a plurality of models on a server, where the server includes at least one graphics processing unit (GPU) and memory coupled with the at least one GPU; load the plurality of models onto the memory of the server at once; and serve the plurality of models, where the single engine accommodates all structures and weights of the plurality of models with a shared input and output of the memory.

According to a third aspect of the present disclosure, a non-transitory computer readable storage medium is provided, including instructions stored therein, where, upon execution of the instructions by one or more processors, the instructions cause the one or more processors to perform acts including: providing a single engine for a plurality of models on a server, where the server includes at least one graphics processing unit (GPU) and memory coupled with the at least one GPU; loading the plurality of models onto the memory of the server at once; and serving the plurality of models, where the single engine accommodates all structures and weights of the plurality of models with a shared input and output of the memory.

It is to be understood that both the foregoing general description and the following detailed description are exemplary and explanatory only and are not restrictive of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1A:
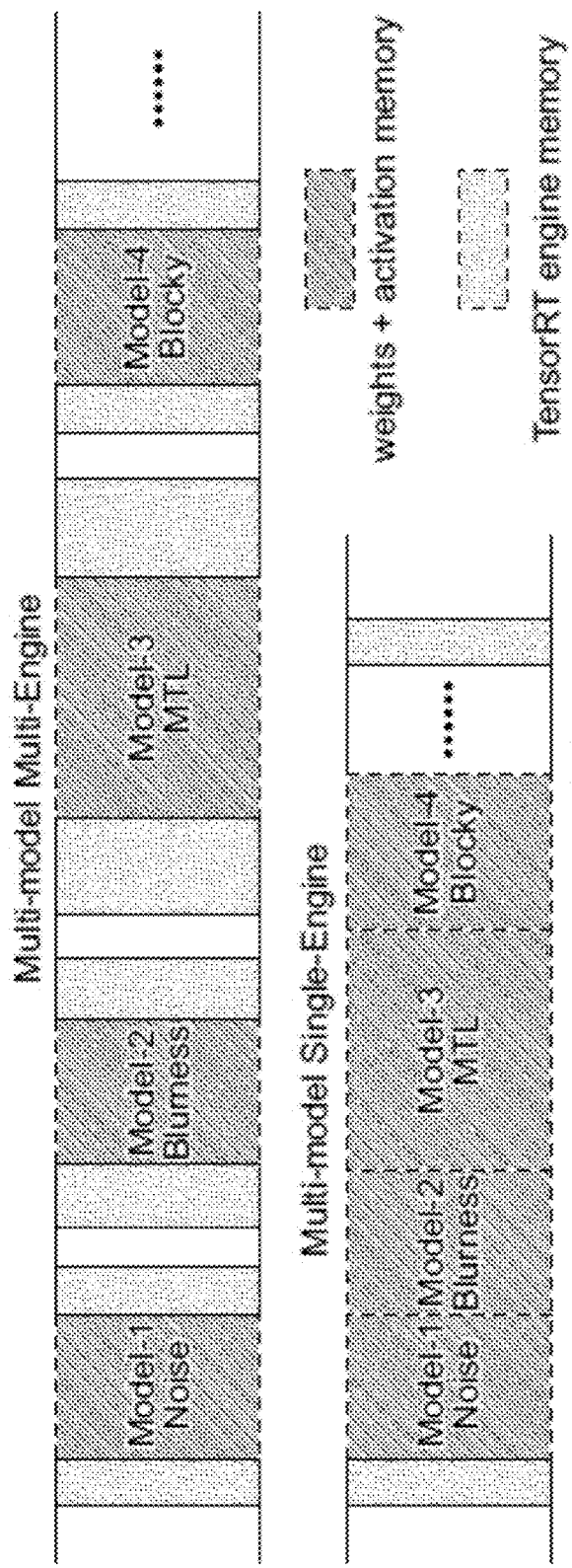
FIG. 1A is a schematic diagram illustrating exemplary model applications in accordance with one or more examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

It may be regards as one of the best practices now to have several AI models concurrently serving on a single heterogeneous hardware to maximize the computing potential of the respected hardware for throughput-oriented AI Applications. However, without proper scheduling mechanisms, having multiple AI execution engines deployed on single heterogeneous hardware often leads to chaos. There are several issues raised by this deployment method, and one of the many could be memory inefficiently. Since each model is unaware of the other models running on the same hardware, there is no way for models to share the common memory space such as in/output buffer, buffer memory, scratch memory, etc. This deployment method leads to a waste of rather precious device memory space. Another major problem would be computing competency, which happens when multiple engines get the request at approximately the same time. These engines immediately start calculating and could lead to frequent on-device job switching, which in turn leads to a waste of the total computing power of the heterogeneous device.

In the present disclosure, a single-engine serving method is provided. Such method allows lossless model stitching between multiple models and allows all models to be served as a whole on the target heterogeneous device. This approach, as presented in the disclosure, employs a single engine to accommodate all model structures and weights with a shared input/output memory space. The engine maintains a set of queues for each model and sends the head job from each queue into the execution engine in a batched manner. This single-engine serving technique has been implemented in the GPU servers of our data center, and the results show that the proposed approach vastly improved the service throughput or latency while drastically reducing the memory requirement of the model serving. This idea and design are neat, and implementation is straightforward.

NVIDIA MPS (Multiple Process Service) application may be a similar application compared to what is disclosed in the present disclosure. However, MPS utilize a server and client architecture for handling multiple job service request and combine all the request into a stream for hardware handling. MPS have no model structure or weight combination methods, nor maintain a queue for each model inference request.

Nvidia MPS utilizes a complicated server, client architecture where client sends all computing jobs to the host process and combine it into a single queue for device processing. There are several drawbacks of this method, including complicated passing schematics from client to server, low availability from single host process, single stream process with no priority ordering.

Figure 1B:
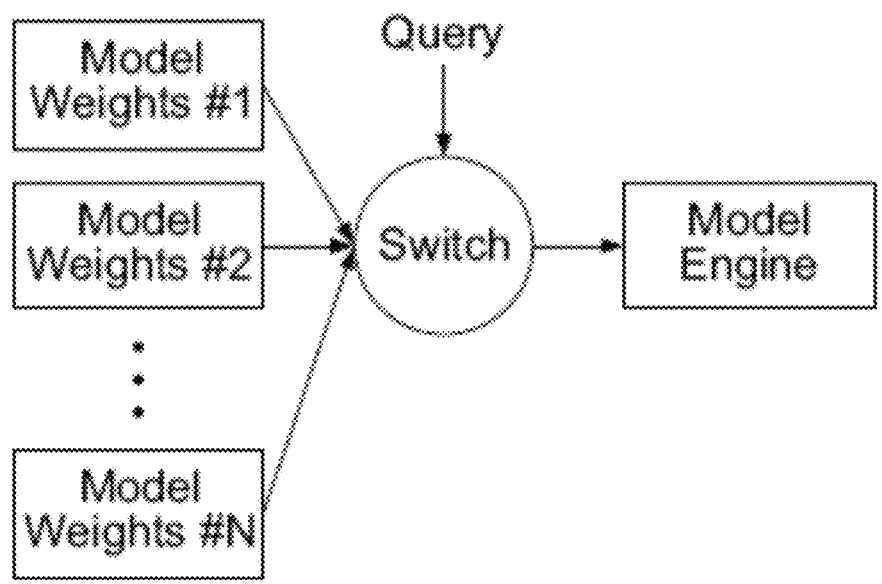
FIG. 1B is a schematic diagram illustrating exemplary model applications in accordance with one or more examples of the present disclosure.

FIG. 1A and FIG. 1B illustrate the schematics of the present disclosure. FIG. 1A illustrates a comparison between a multi-model multi-engine deployment and a multi-model single-engine deployment. As shown in the graph, when the multiple models are deployed on different engines, more TensorRT engine memory are required/wasted in the deployment process. Whereas, when the multiple models are deployed on one single engine, it is a more sufficient use of the engine memory, etc.

FIG. 1B shows an example of how multiple models are deployed on one model engine. Different models are assigned with a weight, and the weighted models are fed into a switch before loading onto the one model engine.

In the present disclosure, a single-engine serving method is provided. This single-engine serving method allows combining multiple models into a single execution engine for easier deployment and better throughput. This approach employs a single engine to accommodate all model parameters and architectures. The engine is launched, and all models are loaded into hardware device memory only once before actual serving, eliminating the overhead for data movement, kernel launching and initialization.

Figure 2:
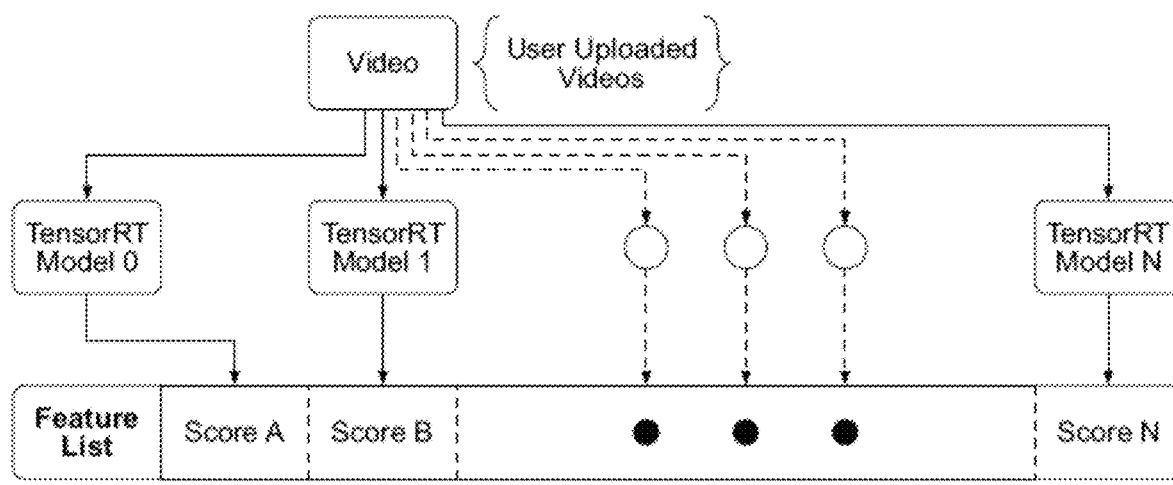
FIG. 2 is a schematic diagram illustrating an exemplary single engine serving process in accordance with one or more examples of the present disclosure.
Figure 3:
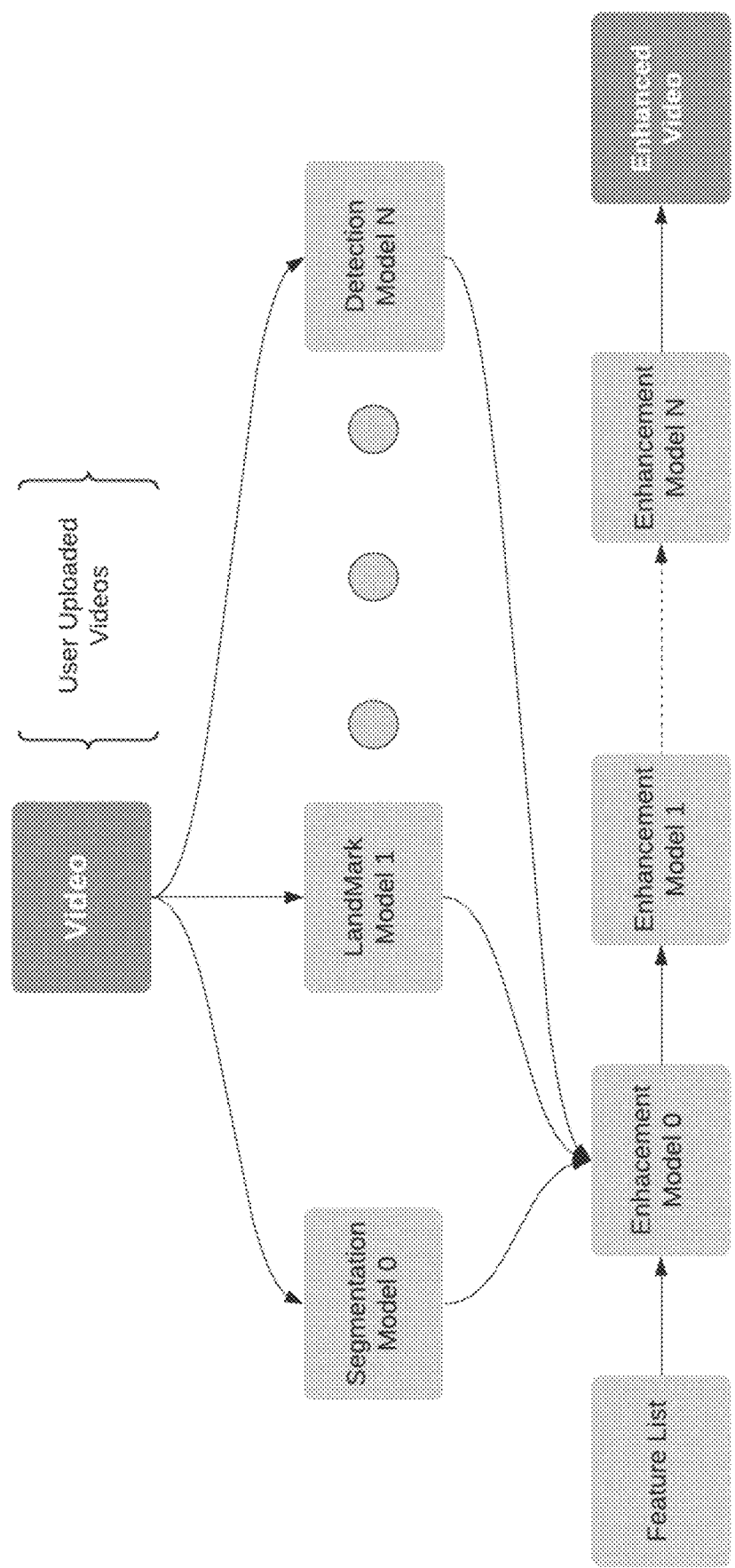
FIG. 3 is a schematic diagram illustrating an exemplary single engine serving process in accordance with one or more examples of the present disclosure.

FIG. 2 and FIG. 3 illustrate an example of the single-engine deployment method in the present disclosure. This approach employs a single engine rather than multiple engines for application serving. During serving, the engine inferences using all inputs and starts a batch processing of inputs. FIG. 2 shows one application model for video representation learning. It is composed of multiple Resnet50 models for image embedding.

Millions of videos may pass through one video processing pipeline every day, and all of these videos need to be processed by a large number of AI models. These large number of AI models require very high processing power. CPU only servers may not be able to handle all such processing jobs efficiently. Thus, GPU servers are required to process the large number of videos, because GPU may provide much higher throughput and it is much cheaper to use a single GPU than a CPU server for processing the same job.

The user uploaded videos may be decoded by CPU or GPU, depend on whether such videos are supported by the hardware decoders. Some of the videos may be decoded by CPU decoder, and some others may be decoded by GPU decoder. All decoded videos may need to pass through AI models for further processing to generate enhanced videos, such AI models may include Video Quality Enhancement models, Video Feature Extraction models, etc. After the videos being processed by the AI models, enhanced videos and some feature lists are generated. The enhanced videos may be saved to database for sharing. The features lists may include multiple video features scores, and such feature lists may be used by other jobs, like video recommendations, etc.

In some examples of feature extraction process based on the present disclosure as shown in FIG. 2, every video uploaded by users may need to pass through all AI models. Each task may have around 15 lite models, most of which are CNN networks similar to Resnet 18. Each model may have its own engine and context, and each model may be preloaded waiting for new inputs. All models are deployed on one single GPU.

In some examples of video enhancement process based on the present disclosure as shown in FIG. 3, every video uploaded by users may need to first pass through a set of detection models, and then pass through a set of enhancement models. All of these models are heavy and computing intensive models. Each model may have its own engine and context, and each model may be preloaded waiting for new inputs. One set of models are to be deployed on one single GPU.

This approach relies on a single engine for multiple models deploying on a single GPU. With no conflict between model serving, the disclosed approach can significantly reduce memory footprint and increase inference throughput. This single-engine serving technique has been implemented in the GPU servers of data center and the results show that the proposed approach introduces a better performance compare to traditional approach.

Figure 4:
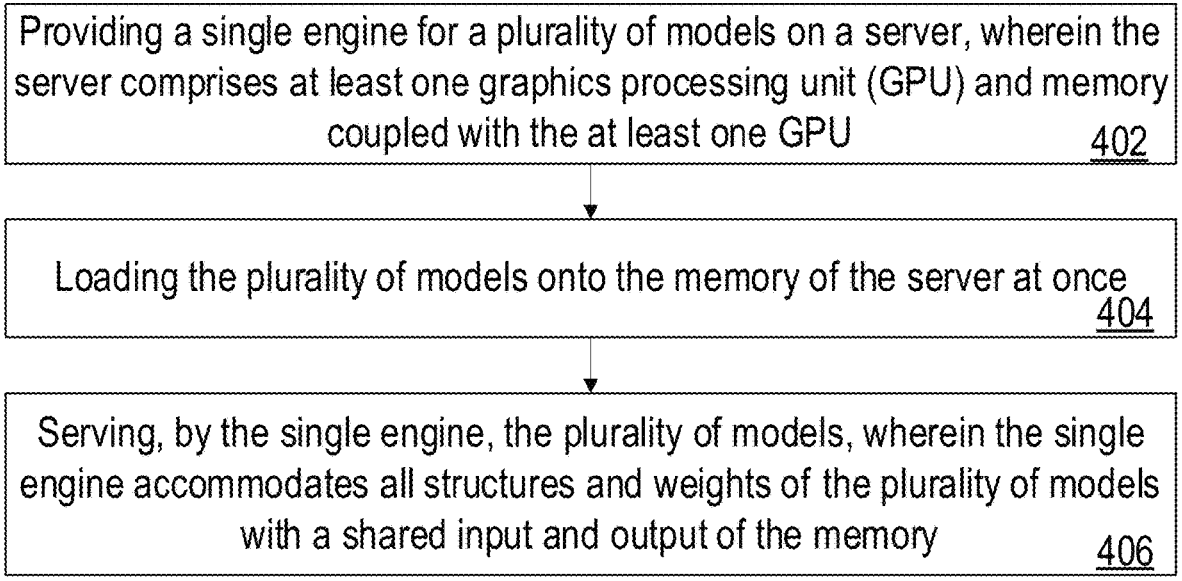
FIG. 4 is a flow diagram illustrating a single-engine serving method according to some examples of the present disclosure.

FIG. 4 illustrates an example of the single-engine serving method in accordance with the present disclosure. In Step 402, one single engine is provided on a server for loading a plurality of models. The server may include at least one GPU and memory coupled with the GPU. In Step 404, the plurality of models are loaded onto the memory of the server at once. In Step 406, the single engine will serve the plurality of models, and the single engine accommodates all structures and weights of the plurality of models with a shared input and output of the memory.

Figure 5:
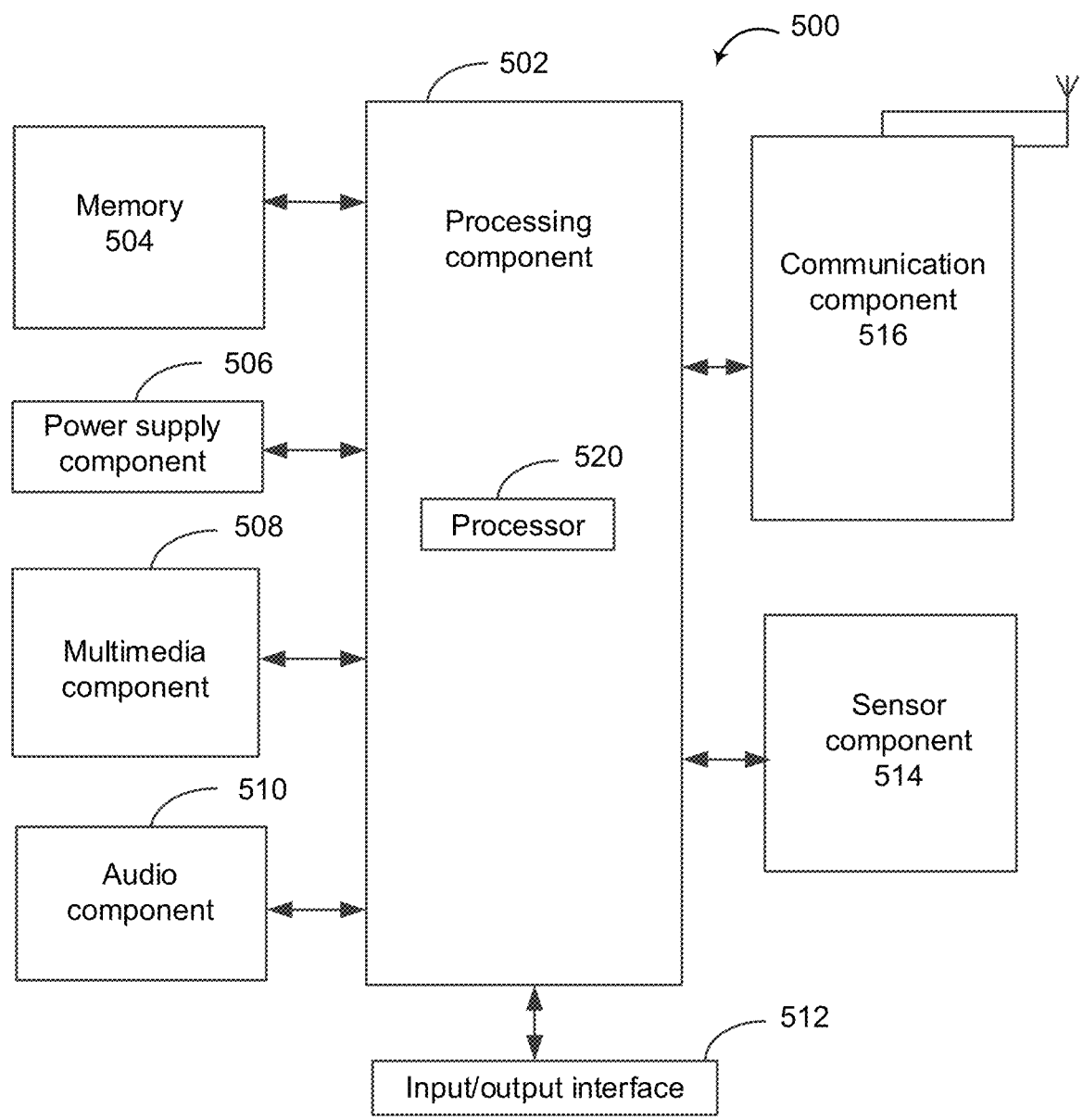
FIG. 5 is a block diagram illustrating an exemplary apparatus for neural network quantization in accordance with some implementations of the present disclosure.

FIG. 5 is a block diagram illustrating an exemplary apparatus for neural network quantization in accordance with some implementations of the present disclosure. The apparatus 500 may be an edge device, such as a terminal, a mobile phone, a tablet computer, a digital broadcast terminal, a tablet device, a personal digital assistant, or any computing device including one or more processors.

As shown in FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls overall operations of the apparatus 500, such as operations relating to display, a telephone call, data communication, a camera operation and a recording operation. The processing component 502 may include one or more processors 520 for executing instructions to complete all or a part of steps of the above method. Further, the processing component 502 may include one or more modules to facilitate interaction between the processing component 502 and other components. For example, the processing component 502 may include a multimedia module to facilitate the interaction between the multimedia component 508 and the processing component 502. The one or more processors 520 may include one or more of following processors: a central processing unit (CPU), a graphic processing unit (GPU), a General Matrix Multiplication (GEMM) processor, a pointwise processor, a digital signal processor (DSP), etc.

The memory 504 is configured to store different types of data to support operations of the apparatus 500. Examples of such data include instructions, contact data, phonebook data, messages, pictures, videos, and so on for any application or method that operates on the apparatus 500. The memory 504 may be implemented by any type of volatile or non-volatile storage devices or a combination thereof, and the memory 504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 supplies power for different components of the apparatus 500. The power supply component 506 may include a power supply management system, one or more power supplies, and other components associated with generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 508 may include a front camera and/or a rear camera. When the apparatus 500 is in an operation mode, such as a shooting mode or a video mode, the front camera and/or the rear camera may receive external multimedia data.

The audio component 510 is configured to output and/or input an audio signal. For example, the audio component 510 includes a microphone (MIC). When the apparatus 500 is in an operating mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module. The above peripheral interface module may be a keyboard, a click wheel, a button, or the like. These buttons may include but not limited to, a home button, a volume button, a start button and a lock button.

The sensor component 514 includes one or more sensors for providing a state assessment in different aspects for the apparatus 500. For example, the sensor component 514 may detect an on/off state of the apparatus 500 and relative locations of components. For example, the components are a display and a keypad of the apparatus 500. The sensor component 514 may also detect a position change of the apparatus 500 or a component of the apparatus 500, presence or absence of a contact of a user on the apparatus 500, an orientation or acceleration/deceleration of the apparatus 500, and a temperature change of apparatus 500. The sensor component 514 may include a proximity sensor configured to detect presence of a nearby object without any physical touch. The sensor component 514 may further include an optical sensor, such as a CMOS or CCD image sensor used in an imaging application. In some examples, the sensor component 514 may further include an acceleration sensor, a gyroscope sensor, a magnetic sensor, a pressure sensor, or a temperature sensor.

The communication component 516 is configured to facilitate wired or wireless communication between the apparatus 500 and other devices. The apparatus 500 may access a wireless network based on a communication standard, such as WiFi, 4G, or a combination thereof. In an example, the communication component 516 receives a broadcast signal or broadcast related information from an external broadcast management system via a broadcast channel. In an example, the communication component 516 may further include a Near Field Communication (NFC)

module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc. The storage medium may be used to store or buffer data, network, and parameters.

In some examples, there is provided an apparatus for the single-engine serving method. The apparatus includes one or more processors 520; and a memory 504 configured to store instructions executable by the one or more processors; where the one or more processors, upon execution of the instructions, are configured to perform a method as illustrated in FIG. 4.

In some other examples, there is provided a non-transitory computer readable storage medium 504, having instructions stored therein. When the instructions are executed by one or more processors 520, the instructions cause the processors to perform a method as illustrated in FIG. 4.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A single-engine serving method, comprising:
providing a single engine for a plurality of models on a server, wherein the server comprises at least one graphics processing unit (GPU) and memory coupled with the at least one GPU;
loading the plurality of models onto the memory of the server at once; and
serving, by the single engine, the plurality of models, wherein the single engine accommodates all structures and weights of the plurality of models with a shared input and output of the memory.

2. The single-engine serving method of claim 1, further comprising:
maintaining, by the single engine, a set of queues for each of the plurality of models; and
sending, by the single engine, a head job from each queue into an execution engine in a batched manner.

3. The single-engine serving method of claim 1, further comprising:
batch processing, by the single engine, all the inputs of the plurality of models.

4. The single-engine serving method of claim 1, further comprising:
deploying the plurality of models on one single graphics processing unit (GPU).

5. The single-engine serving method of claim 4, further comprising:
receiving a decoded video uploaded by a user; and
processing the decoded video with the plurality of models, wherein all the plurality of models are deployed on one single GPU.

6. The single-engine serving method of claim 5, wherein each of the plurality of models has its own engine and context, and is preloaded on the one single GPU for processing new input.

7. The single-engine serving method of claim 4, further comprising:
receiving a decoded video uploaded by a user; and
processing the decoded video with a set of detection models and a set of enhancement models, wherein all models in the set of detection models are deployed on one single GPU, and all models in the set of enhancement models are deployed on one single GPU.

8. The single-engine serving method of claim 7, wherein each of the detection models and the enhancement models has its own engine and context, and is preloaded on the one single GPU for processing new input.

9. An apparatus for single-engine serving, comprising:
one or more processors; and
a memory configured to store instructions executable by the one or more processors;
wherein the one or more processors, upon execution of the instructions, are configured to:
provide a single engine for a plurality of models on a server, wherein the server comprises at least one graphics processing unit (GPU) and memory coupled with the at least one GPU;
load the plurality of models onto the memory of the server at once; and
serve the plurality of models, wherein the single engine accommodates all structures and weights of the plurality of models with a shared input and output of the memory.

10. The apparatus for single-engine serving of claim 9, wherein the one or more processors are further configured to:
maintain a set of queues for each of the plurality of models; and
send a head job from each queue into an execution engine in a batched manner.

11. The apparatus for single-engine serving of claim 9, wherein the one or more processors are further configured to:
batch process all the inputs of the plurality of models.

12. The apparatus for single-engine serving of claim 9, wherein the one or more processors are further configured to:
deploy the plurality of models on one single graphics processing unit (GPU).

13. The apparatus for single-engine serving of claim 12, wherein the one or more processors are further configured to:

receive a decoded video uploaded by a user; and process the decoded video with the plurality of models, wherein all the plurality of models are deployed on one single GPU.

14. The apparatus for single-engine serving of claim 13, wherein each of the plurality of models has its own engine and context, and is preloaded on the one single GPU for processing new input.

15. The apparatus for single-engine serving of claim 12, wherein the one or more processors are further configured to:

receive a decoded video uploaded by a user; and process the decoded video with a set of detection models and a set of enhancement models, wherein all models in the set of detection models are deployed on one single GPU, and all models in the set of enhancement models are deployed on one single GPU.

16. The apparatus for single-engine serving of claim 15, wherein each of the detection models and the enhancement models has its own engine and context, and is preloaded on the one single GPU for processing new input.

17. A non-transitory computer readable storage medium, comprising instructions stored therein to implement a single-engine serving, wherein, upon execution of the instructions by one or more processors, the instructions cause the one or more processors to perform acts comprising:

providing a single engine for a plurality of models on a server, wherein the server comprises at least one graphics processing unit (GPU) and memory coupled with the at least one GPU;

loading the plurality of models onto the memory of the server at once; and serving the plurality of models, wherein the single engine accommodates all structures and weights of the plurality of models with a shared input and output of the memory.

18. The non-transitory computer readable storage medium of claim 17, wherein the instructions cause the one or more processors to perform acts further comprising:

maintaining a set of queues for each of the plurality of models; and sending a head job from each queue into an execution engine in a batched manner.

19. The non-transitory computer readable storage medium of claim 17, wherein the instructions cause the one or more processors to perform acts further comprising:

deploying the plurality of models on one single graphics processing unit (GPU).

20. The non-transitory computer readable storage medium of claim 19, wherein the instructions cause the one or more processors to perform acts further comprising:

receiving a decoded video uploaded by a user; and processing the decoded video with the plurality of models, wherein all the plurality of models are deployed on one single GPU.

* * * * *